April 6, 1937.　　　G. L. BROWN　　　2,075,798
COMBINED HAND AND AUTOMATICALLY CONTROLLED TRANSMISSION
Filed April 23, 1935　　5 Sheets-Sheet 1
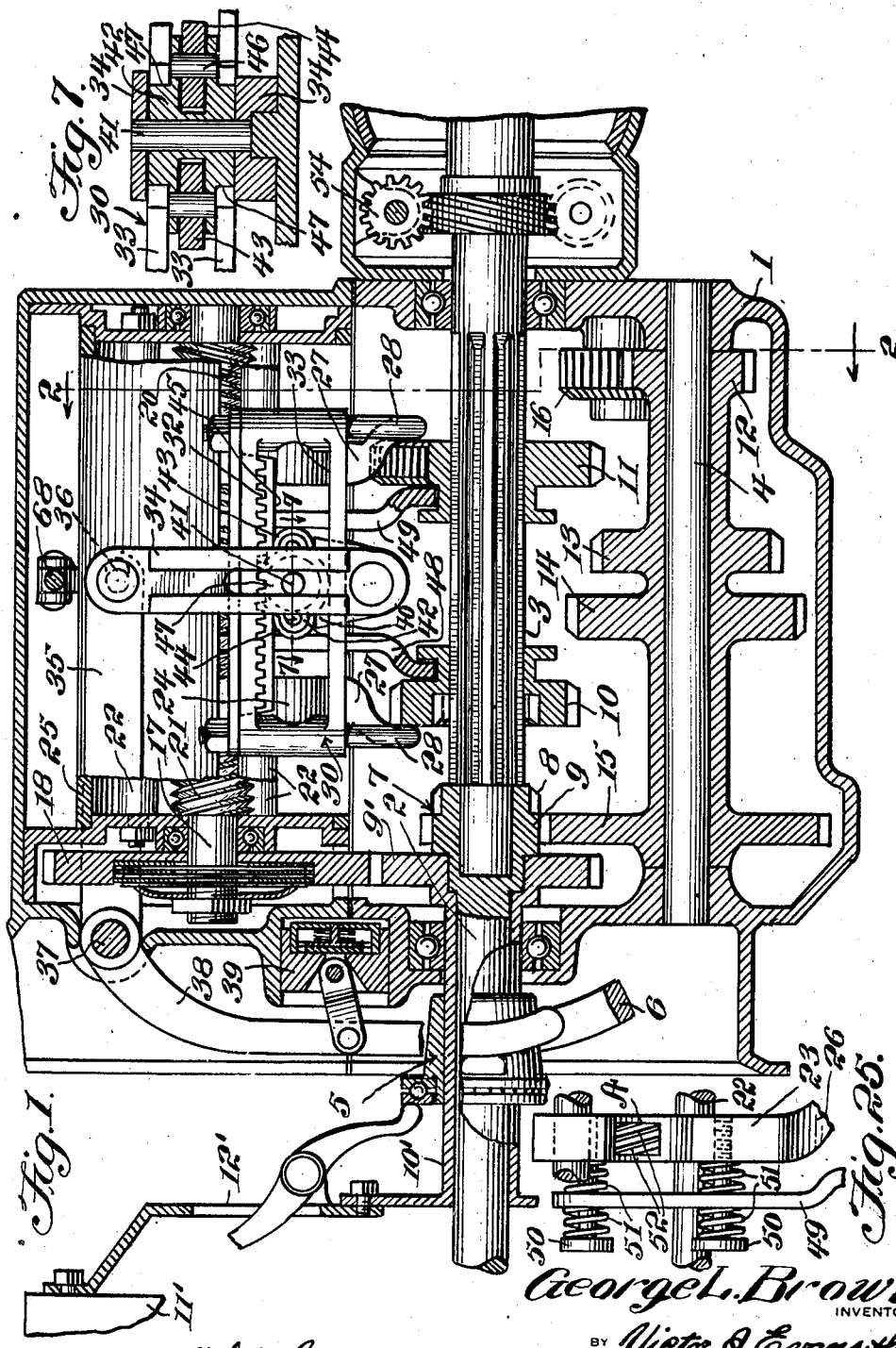
George L. Brown
INVENTOR
BY Victor J. Evans & Co.
ATTORNEY
WITNESS J. T. L. Wright April 6, 1937. G. L. BROWN 2,075,798
COMBINED HAND AND AUTOMATICALLY CONTROLLED TRANSMISSION
Filed April 23, 1935 5 Sheets-Sheet 2
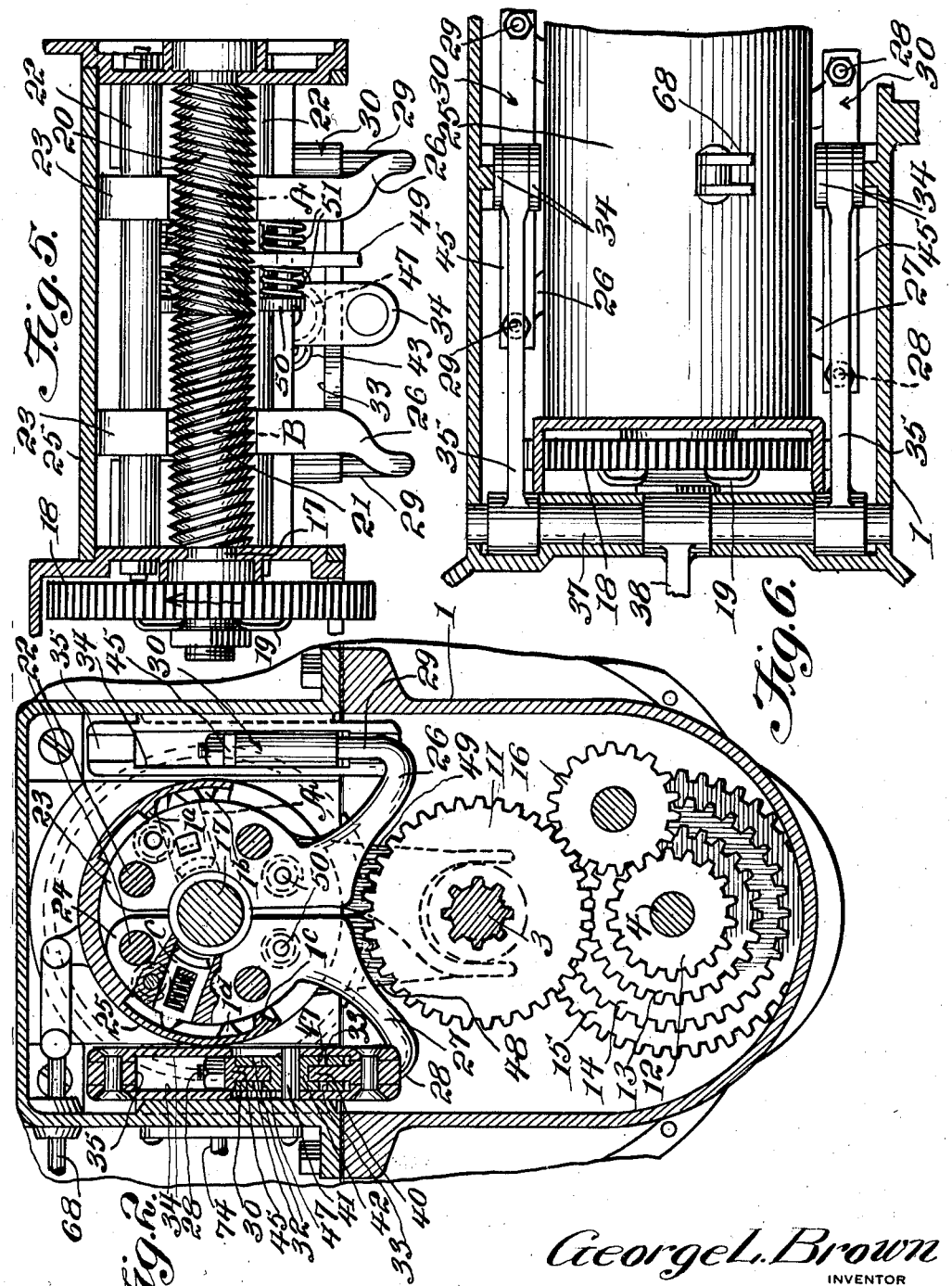
George L. Brown
INVENTOR
BY Victor J. Evans & Co.
ATTORNEY
WITNESS J. L. Wright

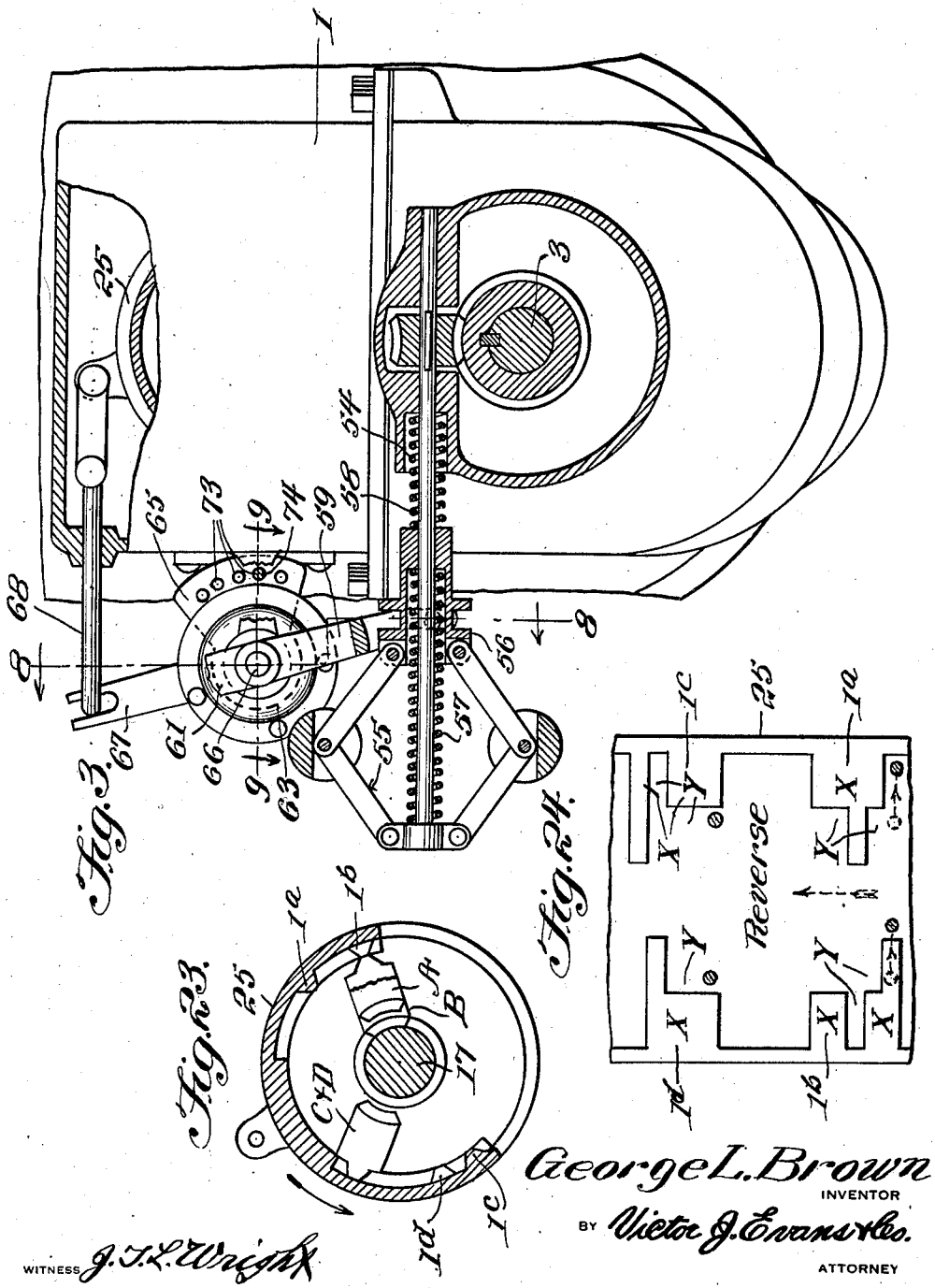

April 6, 1937. G. L. BROWN 2,075,798
COMBINED HAND AND AUTOMATICALLY CONTROLLED TRANSMISSION
Filed April 23, 1935  5 Sheets-Sheet 4
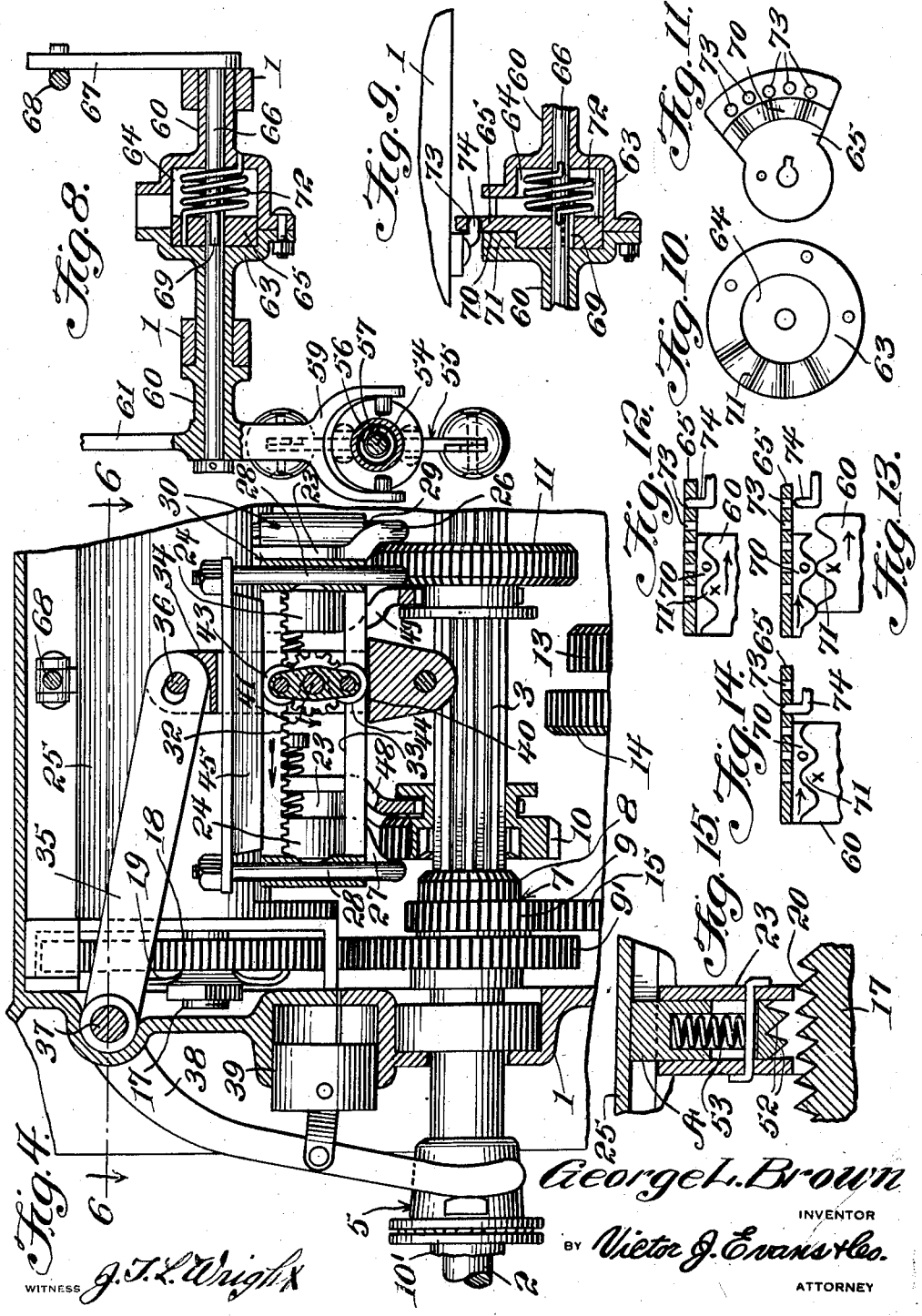
George L. Brown
INVENTOR
BY Victor J. Evans & Co.
ATTORNEY
WITNESS J. T. L. Wright

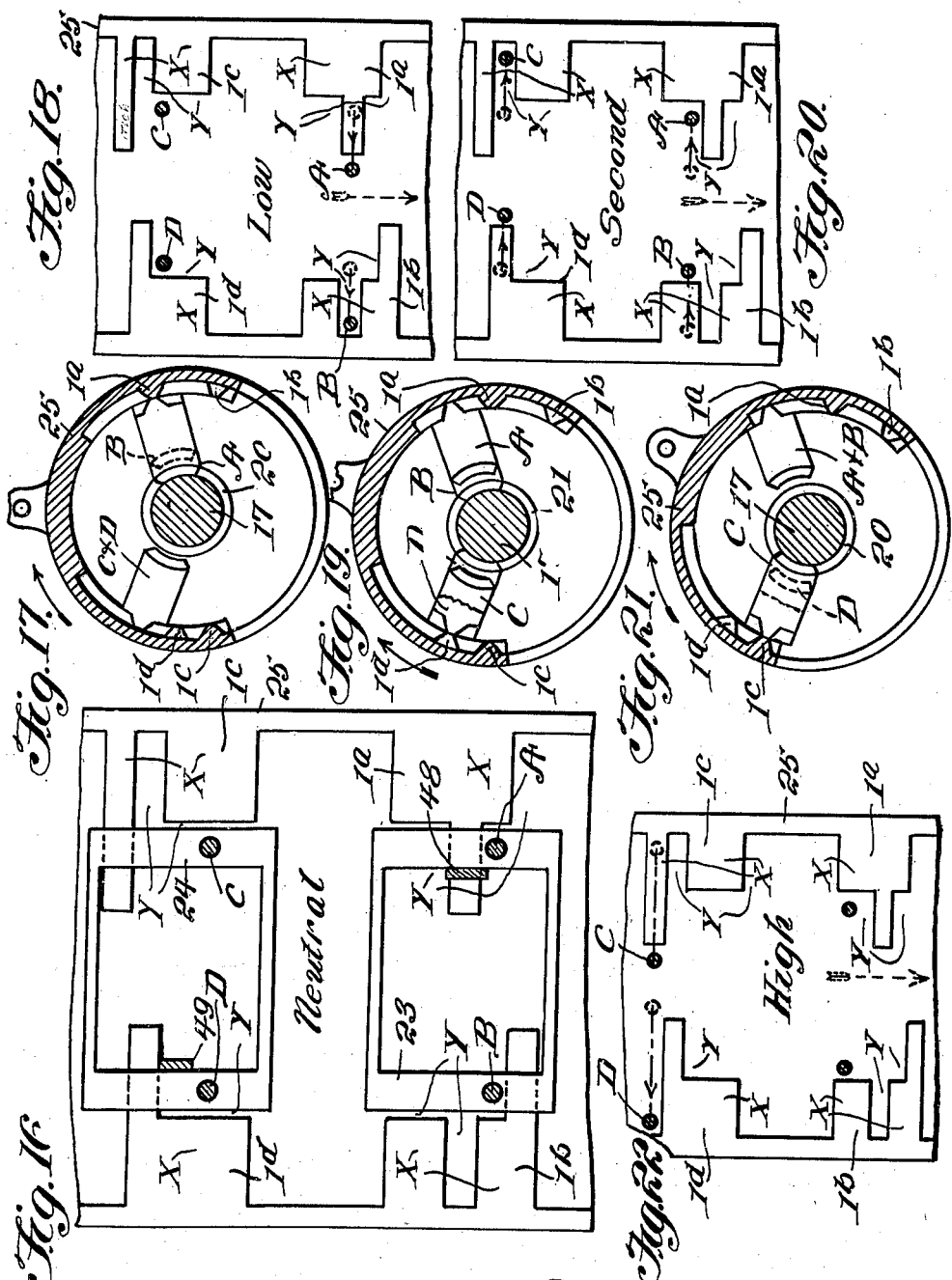

Patented Apr. 6, 1937

2,075,798

UNITED STATES PATENT OFFICE 2,075,798

COMBINED HAND AND AUTOMATICALLY CONTROLLED TRANSMISSION

George L. Brown, Clearwater, Fla.

Application April 23, 1935, Serial No. 17,864

18 Claims. (Cl. 74—336.5)

This invention relates to a selective variable speed transmission for a motor vehicle to provide to said vehicle neutral, first, second and high gears or speeds and reverse, and has for the primary object the provision of a device of this character whereby any one of the speeds and reverse may be had by manual operation and will provide automatically second and high speeds and back from said last-named speeds to first and neutral by the variance of speed of travel of the vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a fragmentary vertical sectional view illustrating a selective variable speed transmission constructed in accordance with my invention.

Figure 2 is a transverse sectional view taken on the line 2—2 of Figure 1.

Figure 3 is a transverse sectional view showing the governor controlling the automatic operation of the transmission.

Figure 4 is a fragmentary vertical sectional view showing the clutch disengaged and the device after it has completed a part of its operation in the changing of one speed to another.

Figure 5 is a fragmentary horizontal sectional view showing a part of the automatic operating means of the transmission.

Figure 6 is a sectional view taken on the line 6—6 of Figure 4.

Figure 7 is a detail sectional view showing the construction of one of the racks and the cam means therefor.

Figure 8 is a sectional view taken on the line 8—8 of Figure 3.

Figure 9 is a sectional view taken on the line 9—9 of Figure 3.

Figure 10 is a plan view illustrating a cam plate forming a part of a sleeve employed in the automatic control.

Figure 11 is a plan view illustrating a control plate employed in conjunction with the cam plate shown in Figure 10.

Figure 12 is a diagrammatical view showing the control plate positioned with respect to the cam plate when holding the automatic operating means in one of its positions.

Figure 13 is a view similar to Figure 12, showing the relation between the control plate and the cam plate when said control plate advances from one position to another position.

Figure 14 is a view similar to Figure 12, showing the control plate associated with the cam plate and in another position from that shown in Figure 12.

Figure 15 is a fragmentary sectional view showing the construction of one of the cam actuated dogs for establishing a drive between a worm and one of the carriers forming a part of the automatic operating means.

Figure 16 is a diagrammatical view showing the arrangement of the cams for effecting operation of the dogs and carried by a control shell of the automatic operating mechanism.

Figure 17 is a detail transverse sectional view showing the position of the control shell to bring about low gear or speed of the transmission.

Figure 18 is a diagrammatical view showing the associations of the cams of the control shell and the dogs in obtaining low speed or gear.

Figure 19 is a view similar to Figure 17, showing the control shell positioned to bring about the second gear or speed of the transmission.

Figure 20 is a view similar to Figure 18, showing the cams and dogs associated to bring about second gear or speed of the transmission.

Figure 21 is a view similar to Figures 17 and 19 showing the control shell positioned to bring about high gear or speed of the transmission.

Figure 22 is a view similar to Figures 18 and 20 showing the association of the dogs and cams to bring about high speed or gear of the transmission.

Figure 23 is a view similar to Figures 17, 19 and 21 showing the control shell positioned to bring about reverse of the transmission.

Figure 24 is a view similar to Figures 18, 20 and 22 to illustrate the association of the cams and dogs to bring about reverse of the transmission.

Figure 25 is a fragmentary view showing a yieldable connection between a gear finger and a rack of the invention.

Referring in detail to the drawings, the numeral 1 indicates the housing for the transmission which may be of any conventional construction and rotatably supports a drive shaft 2, a driven shaft 3 and a counter or jack shaft 4. The driven shaft 3 is piloted in the drive shaft 2 and the latter is connected to the usual vehicle clutch employed for connecting and disconnecting the transmission to the power source (not shown), the clutch operating collar is shown at 5. The clutch may be controlled manually by a foot pedal or similar device shown generally at 6. Secured to the drive shaft 2 is a gear 7 consisting of a toothed clutch element 8 and a power takeoff gear 9. A gear 9' is journaled on the drive shaft 2 and is integral with a sleeve 10' which is secured to a fly wheel 11' of an engine (not shown) by the clutch housing 12' of the clutch whereby the gear 9' will be driven directly from the engine. Operating in conjunction with the toothed clutch element 8 is a speed changing gear 10 splined on the driven shaft 3. Also splined on the driven shaft 3 is a speed changing gear 11. Journaled on the counter or jack shaft 4 is a reverse gear 12, a low speed gear 13 and a second speed gear 14. The gears 12, 13 and 14 are of integral construction and also integral therewith is a gear 15 meshing with the gear 7 so that the gears 12, 13 and 14 will be rotated by the drive shaft 2. The speed changing gear 11 operates in conjunction with the reverse gear 12 and the low gear 13, there being an idler gear 16 meshing with the reverse gear 12 and engaged by the changing gear 11 to obtain reverse to the transmission. The speed changing gear 11 meshes directly with the low speed gear 13 to obtain low speed to the transmission. The changing gear 10 is engageable with either the second gear 14 or the toothed clutch element 8. The speed changing gears 11 and 10 are operated by a mechanism forming the subject matter of the present invention which is automatic in operation and also under manual control.

Rotatably supported by the housing 1 above the drive and driven shafts 2 and 3 is a shaft 17 and free on said shaft is a gear 18 meshing with the gear 9'. A slip clutch 19 of any conventional construction establishes a drive connection between the gear 18 and the shaft 17. The purpose of the slip clutch is to maintain a driving connection between the fly wheel of the engine and the shaft 17 up to a certain load and should the shaft 17 receive an excessive load due to jamming of gears in the transmission or the failure of gears to properly mesh, the clutch 19 will free the shaft 17 from the fly wheel of the engine.

Formed on the shaft 17 are right and left-hand worms 20 and 21. Supported by the housing 1 and grouped about and paralleling the shaft 17 are supporting rods 22 which slidably support carriers 23 and 24, portions of which are of segmental shape. A semicylindrical control shell 25 is journaled to the housing 1 and surrounds or encases parts of the carriers 23 and 24, the supporting rods 22 and shaft 17 also extending through the control shell 25. Pairs of arms 26 and 27 are integral with the carriers 23 and 24, respectively. The arms 26 and 27 project outwardly of the control shell and are provided with vertically arranged portions 28 and 29 extending upwardly on opposite sides of the shell. It is to be understood that the portions 29 of the arms 26 are arranged at one side of the shell while the portions 28 of the arms 27 are arranged at the opposite side of the shell. Secured to the vertical portions 28 of the arms 26 and 27 are racks 30. The carriers are slidable and consequently the racks slide therewith and each include an elongated frame of rectangular shape in cross section and of skeleton formation. The frames of the racks are arranged horizontally and each frame has horizontally arranged rack teeth 32 opposed by horizontally arranged bearing faces 33. The rack teeth 32 are arranged above the bearing faces 33. Vertically arranged connecting elements 34 are slidably supported by the housing 1 at opposite sides of the control shell and project above and below the racks 30 and have their upper ends connected to arms 35 by pin and slot connections 36 and said arms are secured to a shaft 37 journaled to the housing 1 and arranged transversely of one end of the control shell. The shaft 37 is connected to the clutch operating collar 5 by a clutch fork 38. A dash pot 39 of any conventional construction is carried by the housing 1 and is connected to the clutch fork 38 and acts to retard or slow up the engagement of the clutch after the latter has been freed from a disengaged position. Formed on the lower ends of the connecting elements 34 are bearing faces 40 which bearing faces are arranged adjacent to and move relative to the bearing faces 33. Stub shafts 41 extend through slots in the connecting elements 34 and also through the frames of the racks 30 between the teeth 32 and the bearing faces 33 and have journaled thereon eccentric members 42 operating within the frames of the racks 30 and each equipped with oppositely arranged rollers 43 and 44. The upper portions of the frames of the racks 30 have horizontally arranged bearing faces 45 of elongated formation and arranged above and opposite to the bearing faces 40. The bearing faces 45 may be considered of a relatively fixed nature while the bearing faces 40 are considered movable due to the fact that they are carried or form part of the connecting elements 34. It is true that the bearing faces 45 move with the racks 30 but this movement is in a horizontal plane while the movement of the bearing faces 40 is vertical. The bearing faces 40 and 45 are engaged and disengaged by the rollers 43 and 44. Stub shafts 46 form journals for the rollers 44 and are journaled to the eccentrics 42. Gears 47 are secured to the eccentrics and mesh with the teeth 32 of the racks 30 so that on sliding movement of the racks in either direction from the position shown in Figure 1, due to the movement of the carriers, the gears 47 are rotated rocking the eccentrics 42 bringing the rollers 43 and 44 against the bearing faces 45 and 40 with force and assuming the position shown in Figure 4, causing a downward movement of the connecting elements 34. This movement brings about a disengagement of the clutch, as shown in Figure 4. The racks 30 returning to neutral position or as shown in Figure 1, disengage the rollers 43 and 44 from the bearing faces freeing the connecting elements 34 of the downward force so that the clutch may return to clutch engaging position by its own action and which movement is retarded by the dash pot 39.

Gear fingers 48 and 49 are connected with the speed changing gears 10 and 11. The gear finger 48 is connected to the carrier 24 while the gear finger 49 is connected to the carrier 23. The connections between the gear fingers and their respective carriers are as shown in Figure 25. These connections are of a yieldable construction so that the carriers may have a limited movement before effecting movement of the gear fingers, the purpose of which is to permit the racks 30 to disengage the clutch prior to imparting movement to the speed changing gears 10 and 11. Each connection, as shown in Figure 25, consists of headed pins 50 on which the gear finger is slidably mounted and the pins are connected to the arms of the carrier. Mounted on the pins 50 are coil springs 51 interposed between the gear finger and the arm of the carrier and between said gear finger and the heads of the pins. These springs permit a limited movement of the carrier or the rack connected thereto prior to imparting movement to the gear finger, as before stated.

Movably mounted to the carrier 23 are cam actuated dogs A and B and movably mounted to the carrier 24 are cam actuated dogs C and D. The dogs A and B of the carrier 23 operate in conjunction with the worms 20 and 21 and the dogs C and D operate in conjunction with the worms 20 and 21. The dogs are radially arranged with respect to the shaft 17 or the worms thereof with their outer ends protruding beyond the peripheries of the carriers and their inner ends provided with feed threads 52 for matching the worms. The dogs are slidably mounted to the carriers and are spring pressed by springs 53 acting to normally position the dogs so that the threads thereof are disengaged from the worms and their cam engaging ends disposed in close proximity to the inner periphery of the control shell 25. The springs 53 maintain the dogs in neutral position, that is, disengaged from the worms and which is clearly shown in Figure 2. Formed upon the inner periphery of the control shell 25 are cams 1a, 1c, 1b and 1d. The cam 1a operates the dog A, the cam 1c operates the dog C. The operation of the dogs A and C by the cams 1a and 1c brings about sliding movement of the carrier 23 in opposite directions from the neutral position had by the parts, as shown in Figure 1. The operation of the dogs B and C by the cams 1b and 1d brings about sliding movement of the carrier 24 in opposite directions. It is to be understood that when a dog is engaged by its cam it is forced inwardly to mesh the threads thereof with its respective worm on the shaft 17 and as the shaft 17 is in constant rotation by the engine, the carrier of that dog is caused to slide in a direction in accordance with the worm engaged by said dog. The engagement of the other dog of said carrier with the other worm imparts a sliding movement to said carrier in an opposite direction.

The cams of the control shell have high faces X and low faces Y. The arrangement of the cams within the control shell can clearly be seen by having reference to the diagrammatical view, Figure 16, also Figures 18 to 20, 22 and 24 show the arrangement of the cams. The raised face of the cam 1a designated by X will include a substantially rectangular shaped portion with an elongated portion extending from one edge thereof with the low faces Y at opposite sides of the elongated portion. The cam 1c has two high faces designated by X with a low face Y therebetween. One of the portions of the high face X of the cam 1c is substantially rectangular shaped while the other portion of the high face X is of elongated formation. The cam 1b has two high faces X with a low face Y therebetween, one of the high faces X being of substantially rectangular shape and the other high face X of elongated formation, a portion of which is of less width than the other. The cam 1d has a high face including a substantially rectangular shaped portion and an elongated portion extending from one edge of the substantially rectangular shaped portion with the low face Y of said cam 1b located to one side of the elongated portion of the raised face X of said cam 1b. The relation of the dogs A, C, B and D to the cams 1a, 1c, 1b and 1d according to the different positions of the control shell is clearly shown in Figures 16 to 24, inclusive, and also Figure 2 should be considered for the purpose of illustrating the position of the dogs when the carriers are in neutral position or the transmission is in neutral. It is to be understood that the dogs may readily ride the high and low faces of the cams in accordance with the movement and positions occupied by the control shell 25.

Geared to the driven shaft 3 is a governor shaft 54 forming part of a governor 55 of the weight type and including a slidable sleeve 56 moved by the action of the weights of the governor 55 in accordance with the speed of rotation of the driven shaft or the speed of travel of the vehicle to which the transmission is applied. The sleeve 56 has a neutral position, as shown in Figure 3, and is urged into this position by the action of coil springs 57 and 58. The sleeve 56 is capable of sliding in either direction from the neutral position shown in Figure 3, and connected to said sleeve 56 is a governor fork 59 secured to a sleeve 60 suitably journaled to the housing 1 and also secured to said sleeve 60 is a hand control lever 61 adapted to be arranged in any convenient position in a motor vehicle for operation by the driver of said vehicle. The sleeve 60 includes an enlarged portion 63 forming a chamber 64 within the sleeve, of a diameter considerably larger than the internal diameter of the sleeve 60. The enlarged portion 64 has an opening to admit a control plate 65 to the chamber 64. Journaled in the sleeve 60 is a shaft 66 which extends through the chamber 64 and also exteriorly of the sleeve 60 and has secured thereto an arm 67. The control shell 25 is connected to the arm 67 by a pitman 68. The control plate 65 is keyed to the shaft 66 within the chamber 64, as shown at 69. The control plate is fixed for rotation with the shaft 66 but may slide relative thereto so that said control plate may shift its position within the chamber 64 to engage and disengage cam faces 70 thereof with cam faces 71 formed on one wall of the chamber 64. Or, in other words, the cam faces 71 form an integral part of the sleeve 60. Surrounding the shaft 66 within the chamber 64 is a coil spring 72, one end of which is connected to the sleeve 60 and the other end of which is connected to the control plate 65. The control plate 65 has several positions which will be hereinafter more fully described and when said control plate is in any one of its positions, the spring 72 is free of tension. However, the movement of the control plate 65 to any one of its positions will place tension on the spring 72. This is accomplished by the sleeve 60 turning relative to the control plate due to the action of the governor 55 upon the sleeve 60. The control plate 65 has a series of openings 73 to be engaged by a pin 74 secured to the housing 1 for holding the control plate in its several positions. There is provided an opening 73 in the control plate for each of the positions or speeds of the transmission, that is, reverse, neutral, first, second and high. The lowermost opening 73, shown in Figure 3, is for reverse and the opening thereabove is neutral. The next three openings are for first, second and high. The sleeve 60 being turned by either the governor or the hand control lever 61 will cause a sliding movement of the control plate 65 due to the cam faces 71 and cam faces 70 shifting relative to each other, as shown in Figures 12 to 14, inclusive. During the sliding movement of the control plate the spring 72 is tensioned due to the sleeve 60 turning relative to the control plate at this time by either the operation of the governor or the hand controlled lever 61. The sliding movement of the sleeve brings about a disengagement of the pin 74 from an opening 73 thereof. As the pin moves out of the opening 73, the spring 72 being under tension acts to turn the control plate until the pin engages the next opening 72. This operation or movements of the control plate is step by step in accordance with the variable speeds of the vehicle due to the action of the governor and imparts to the control shell 25 a step by step movement for the purpose of bringing the cams into engagement with the dogs of the carriers so that said carriers will effect shifting of the speed changing gears at proper time to give the proper speeds to the transmission in accordance with the speed of travel of the vehicle. It is to be understood that when the sleeve 60 turns, the high faces of the cams 61 of said sleeve ride upon the high faces of the cams 70 of the control plate, as shown in Figure 13. This movement of the sleeve tensions the spring 72, also brings about freeing of the control plate so that the spring acts to shift said control plate into its next position and is stopped in its next position by the high faces of the cams 71 and 70 engaging in the low faces, as shown in Figures 12 and 14. This operation gives a step action to the control plate, consequently giving a snap action to the control shell with a step by step movement. The parts shown in Figures 8 and 9 will be termed generally a step by step drive mechanism employed between the governor and the control shell so that the governor may shift the position of the control shell in accordance with the variance of speed of travel of the vehicle.

In describing the operation of this invention it is to be understood that reverse and low gear is established manually and if desired, second and high speeds may be established manually. However, second and high speeds may be automatically obtained through the operation of the governor. The transmission, as shown in Figure 1 is in neutral with the clutch engaged. To start the motor vehicle in reverse or place the transmission in reverse, the operator actuates the control lever 61 in a certain direction which turns the sleeve 60 bringing about operation of the step by step control mechanism to position the control shell one position to the left of that shown in Figure 2. The control shell in the stated position engages the dog B of the carrier 23 in engagement with one of the high faces X of the cam 1b causing said dog B to mesh with the worm 21. This causes a movement of one of the racks 30 to the left in Figure 1, disengaging the clutch and bringing the speed changing gear 11 in mesh with the idle gear 16, thereby establishing reverse to the transmission. During this operation the low faces of the cams 1a, 1c and 1d are disposed over the dogs A, C, and D. A reverse movement of the control lever causes a reverse operation of the step by step control mechanism to restore the control shell 25 to the position shown in Figure 2. During this latter movement of the control shell the dog A is contacted by the high faces X of the cam 1a meshing the dog A with the worm 20 so that the rack 30 will be returned to its neutral or initial position, as shown in Figure 1, repositioning the speed control gear 11 in neutral position. Also during this operation, the rack disengages the clutch and permits said clutch to again engage after the speed changing gear 11 has moved out of mesh with the idle gear 16. It is to be understood that when the speed changing gear either has moved fully in mesh with the idle gear 16 or returned to neutral position, the dogs A and B have passed off of the high faces of their respective cams, thus permitting the springs of said dogs A and B to restore them to neutral position or disengaged from the worms. Having described the operation of the transmission to obtain reverse and back to neutral, I will now describe the operation of the first speed to the transmission. The control lever 61 is manually moved to turn the sleeve 60 in a direction to bring about actuation of the step by step drive mechanism to position the shell from that shown in Figure 2, to that shown in Figure 17. During this operation the device A is engaged by the cam 1a, causing said dog to mesh with the worm 20 which causes one of the racks 30 to travel to the left in Figure 1, bringing the speed changing gear 11 in mesh with the gear 13. As the speed changing gear 11 meshes with the gear 13 the dog A moves off of the high face of the cam 1a permitting the dog A to become disconnected from the worm 20. It is to be understood that the operations reverse and low gear heretofore described are through the carrier 23 while the carrier 24 has remained idle or stationary. To obtain second gear or speed the control shell 25 is moved into the position shown in Figure 19, either by the hand control lever 61 or by the action of the governor. When the control shell is in the position shown in Figure 19, the dog B is engaged by the high face X of the cam 1b to mesh said dog B with the worm 21, causing the rack to slide to the right in Figure 1, disengaging the speed changing gear 11 from the gear 13 and restoring said speed changing gear 11 to neutral position. At the same time dog D is engaged by the high face X of the cam 1d to engage said dog D with the worm 21, causing the carrier 24 to slide and operate the rack connected to the speed changing gear 10 to the right in Figure 1 to mesh the speed changing gear 10 with the gear 14. It is to be understood that the clutch is disengaged and engaged during the movements described to the speed changing gears 10 and 11. The second speed of the transmission has been described and to obtain high gear or speed to the transmission, the shell is moved to occupy the position shown in Figure 21, either by the action of the governor or by the movement of the hand controlled lever. The control shell when in the position shown in Figure 21 brings about engagement of the dog C with the high face X of the cam 1c, meshing said dog C with the worm 20, causing the speed changing gear 10 to slide out of mesh with the gear 14 and travel to the right in Figure 1 until in mesh with the toothed clutch element 8 of the gear 7 on the drive shaft 2. It is to be understood that when the speed changing gear 10 is in mesh with the gear 14, the dog D has passed off of the high face of the cam 1d. When the speed changing gear 10 has moved into mesh with the clutch element 8 of the gear 7 to obtain high speed, the dog C has passed off of the high face X of the cam 1c. Therefore, it will be seen that when the device has been operated either by the hand controlled lever or governor to establish a selected speed to the transmission, the dog which has effected operation of the device to bring about the meshing of the gears will have passed off the high face of its respective cam when said gears are in mesh or out of mesh and in their neutral position.

Should the speed of the vehicle slacken below a predetermined amount, and the transmission being in high gear, the governor will act to progressively restore the transmission in second gear, low gear and neutral position as the speed of the vehicle decreases below the predetermined amount to a full stop.

Having described the invention, I claim:

1. In a transmission mechanism including speed change gearing providing variable forward speeds and reverse to the transmission mechanism and a clutch for connecting and disconnecting the transmission mechanism to a power source, a power driven selecting means connected to said transmission mechanism, clutch operating means connected to said clutch and to said selecting means for actuating the clutch during each operation of the transmission mechanism, a dash pot connected to said clutch operating means controlling the engagement of the clutch, means connecting said selecting means to the speed change gearing, a manual control for operating said selecting means, and a governor mechanism driven by said transmission mechanism and connected to said selecting means for automatically actuating the latter to obtain certain of the variable forward speeds.

2. In a transmission mechanism including speed change gearing providing variable speeds forward and reverse to the transmission mechanism and a clutch for connecting and disconnecting the transmission mechanism to a power source, a selecting means mounted to the transmission mechanism, a drive means connecting said selecting means to a power source, a slip clutch connected in said drive means to discontinue operation of the selecting means when the latter is subjected to an excessive load, means connecting said selecting means to the first clutch for effecting operation of the latter during each change of the variable forward speeds and reverse of the transmission mechanism, means connecting the selecting means to the speed change gearing, a manual control for operating said selecting means to obtain the variable forward speeds and reverse to the transmission mechanism, and a governor mechanism driven by said transmission mechanism and connected to said selecting means for automatically actuating the latter to obtain certain of the variable forward speeds of the transmission mechanism.

3. A transmission comprising a housing, a transmission mechanism mounted in said housing and including speed change gearing and a clutch for connecting and disconnecting the transmission mechanism to a power source, a shaft journaled in said housing, a drive means between a power source and the shaft, right and left hand worms formed on said shaft, a control shell journaled in said housing with the shaft extending therethrough, carriers slidably supported to the housing and operating in the control shell between the latter and the shaft, means connecting said carriers to the speed change gearing and to the clutch, means actuated by the movement of the shell to connect and disconnect the carriers to said worms, and a governor mechanism driven by the transmission mechanism and connected to said shell and including a manual control medium.

4. A transmission comprising a housing, a driven mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, means connecting said carriers to the speed change gearing and to the clutch, means for connecting and disconnecting the carriers to the worms, and a cam mechanism on the shell for actuating said last-named means.

5. A transmission comprising a housing, a transmission mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, cam dogs movably mounted to the carriers for connecting and disconnecting the latter with the worms, a series of cams formed on the control shell for selectively actuating the dogs in accordance with the positions of the control shell, and means connecting said carriers to the speed change gearing and to the clutch.

6. A transmission comprising a housing, a transmission mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, cam dogs movably mounted to the carriers for connecting and disconnecting the latter with the worms, a series of cams formed on the control shell for selectively actuating the dogs in accordance with the positions of the control shell, arms formed on said carriers, means connecting said arms to the speed change gearing, and a connecting means between said carriers and the clutch.

7. A transmission comprising a housing, a transmission mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, cam dogs movably mounted to the carriers for connecting and disconnecting the latter with the worms, a series of cams formed on the control shell for selectively actuating the dogs in accordance with the positions of the control shell, arms formed on said carriers, fingers connected to the speed change gearing, yieldable means connecting said fingers to the arms, and a clutch operating means between the clutch and the arms.

8. A transmission comprising a housing, a transmission mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, cam dogs movably mounted to the carriers for connecting and disconnecting the latter with the worms, a series of cams formed on the control shell for selectively actuating the dogs in accordance with the positions of the control shell, arms formed on said carriers, fingers connected to the speed change gearing, yieldable means connecting said fingers to the arms, racks secured to said arms, connecting elements slidably mounted to the housing, means connecting said connecting element to the clutch, and means actuating the sliding elements by the racks.

9. A transmission comprising a housing, a transmission mechanism mounted in said housing and including speed change gearing and a clutch for connecting and disconnecting the transmission mechanism to a power source, a shaft journaled in said housing, means for driving said shaft by a power source, right and left hand worms formed on said shaft, a control shell journaled in said housing with the shaft arranged therein, carriers slidably supported to said housing and operating between the shaft and the control shell, a governor mechanism driven by said transmission mechanism, a step by step operating means connecting the control shell to the governor mechanism for imparting to the control shell a step by step movement and including a manual control medium, cam dogs movably mounted to the carriers for connecting and disconnecting the latter with the worms, a series of cams formed on the control shell for selectively actuating the dogs in accordance with the positions of the control shell, arms formed on said carriers, fingers connected to the speed change gearing, yieldable means connecting said fingers to the arms, racks secured to said arms, connecting elements slidably mounted to the housing, means connecting said connecting elements to the clutch, bearing faces formed on the connecting elements, bearing faces formed on the racks, stub shafts slidably connected to said connecting elements and extending through the racks between said bearing faces of the racks and the bearing faces of the connecting elements, cam elements journaled on the stub shafts, stub shafts journaled to the cam elements, gearing between the cam elements and the racks to impart movement to the cam elements by the sliding movement of the racks, and rollers journaled to the cam elements by the second-named stub shafts to be engaged and disengaged with the bearing faces by the movements of the cam elements.

10. In a selective sliding gear transmission mechanism including speed change gearing and a clutch for connecting and disconnecting the transmission mechanism to a power source, a power driven selecting means connected to said speed change gearing and to said clutch for the automatic operation of both, a governor connected to and driven by the transmission mechanism, a sleeve journaled to the transmission mechanism, means connecting said sleeve to the governor, a hand control connected to the sleeve, and means actuated by said sleeve and connected to the selecting means for imparting to the latter a step by step movement.

11. In a transmission mechanism including speed change gearing and a clutch for connecting and disconnecting the transmission mechanism to a power source, a power driven selecting means connected to said speed change gearing and to said clutch for the operation of both, a governor connected to and driven by the transmission mechanism, a sleeve journaled to the transmission mechanism, means connecting said sleeve to the governor, a hand control connected to the sleeve, a shaft journaled in the sleeve, means connecting the shaft to the selecting means, a step by step drive between the sleeve and the shaft.

12. In a transmission mechanism including speed change gearing and a clutch for connecting and disconnecting the transmission mechanism to a power source, a power driven selecting means connected to said speed change gearing and to said clutch for the operation of both, a governor connected to and driven by the transmission mechanism, a sleeve journaled to the transmission mechanism, means connecting said sleeve to the governor, a hand control connected to the sleeve, a shaft journaled in the sleeve, means connecting the shaft to the selecting means, a control plate splined to the shaft and having a series of openings indicating positions of the speed change gearing, a fixed pin to engage in said openings, a coil spring connected to the sleeve and to the control plate, co-acting cam faces carried by the control plate and the sleeve for tensioning the spring and for disengaging the control plate from the pin to permit the tensioned spring to act to rotate the shaft.

13. A transmission operating device comprising slidably mounted carriages, means connecting said carriages to speed change gearing of a transmission, a power driven shaft journaled adjacent said carriages, oppositely formed worms secured to said shaft, means carried by said carriages to move into and out of engagement with said worms for effecting sliding movement of the carriages, and means for controlling said second-named means.

14. A transmission operating device comprising slidably mounted carriages, means connecting said carriages to speed change gearing of a transmission, a power driven shaft journaled adjacent said carriages, oppositely formed worms secured to said shaft, means carried by said carriages to move into and out of engagement with said worms for effecting sliding movement of the carriages, a control element journaled adjacent to the shaft, and means carried by said control element for actuating said second-named means.

15. A transmission operating device comprising slidably mounted carriages, means connecting said carriages to speed change gearing of a transmission, a power driven shaft journaled adjacent said carriages, oppositely formed worms secured to said shaft, spring-pressed elements carried by said carriages and having threaded portions to engage the worms, a control element journaled adjacent said carriages and shaft, cams carried by said control element for effecting engagement and disengagement of the spring-pressed elements with the worms, and means for imparting movement to the control element.

16. A transmission operating device comprising slidably mounted carriages, means connecting said carriages to speed change gearing of a transmission, a shaft journaled adjacent said carriages, a drive connection between the shaft and the transmission mechanism, worms formed on said shaft, spring-pressed elements carried by the carriages and engageable with the worms for effecting sliding movement of the carriages, a control means for said spring-pressed elements, a clutch operating means for engaging and disengaging a clutch by said carriages, and means for connecting said clutch operating means with the carriages.

17. In a transmission mechanism including a speed change gearing and a housing therefor, a shaft journaled in said housing, a slip-tight drive between said shaft and the transmission mechanism, oppositely formed worms formed on said shaft, carriages slidably mounted in the housing, means connecting said carriages to the speed change gearing, a control means for connecting and disconnecting the carriages to the worms, a clutch operating means supported by said housing, and means for imparting movement to the clutch operating means by the sliding movement of the carriages.

18. A device for operating a gear selecting means of a transmission comprising a journaled sleeve, means for driving said sleeve at variable speeds, a shaft journaled in the sleeve, means connecting said shaft to a gear selecting means of a transmission, a control plate splined to the shaft and having a series of openings indicating positions of speed change gearing of the transmission, a fixed pin to engage in said openings, a spring connected to the sleeve and to the control plate, and co-acting cam faces carried by the control plate and the sleeve for tensioning said spring and for disengaging the control plate from the pin to permit the tensioned spring to act to rotate the shaft.

GEORGE L. BROWN.